United States Patent
Makishima et al.

(10) Patent No.: US 6,422,267 B1
(45) Date of Patent: Jul. 23, 2002

(54) PIPE COUPLING

(75) Inventors: Reichi Makishima; Hideo Ueno, both of Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 09/996,289

(22) Filed: Nov. 28, 2001

(30) Foreign Application Priority Data

Nov. 29, 2000 (JP) .......................................... 2000-362535

(51) Int. Cl.[7] .................................................. F16K 3/22
(52) U.S. Cl. ................................ 137/616.7; 251/149.2; 251/149.9
(58) Field of Search ..................... 137/616.7; 251/149.2, 251/149.9; 285/184

(56) References Cited

U.S. PATENT DOCUMENTS

| | | | |
|---|---|---|---|
| 2,493,271 A | 1/1950 | Smith et al. | |
| 4,662,396 A | * 5/1987 | Avnon | ..................... 137/616.7 |
| 4,905,965 A | 3/1990 | Dolev | |
| 5,050,841 A | 9/1991 | Jacobsson | |
| 5,326,072 A | 7/1994 | Wuthrich | |
| 5,562,273 A | 10/1996 | Wuethrich | |
| 5,681,027 A | 10/1997 | Wuethrich | |

FOREIGN PATENT DOCUMENTS

DE 1265515 11/1968

* cited by examiner

*Primary Examiner*—Kevin Lee
(74) *Attorney, Agent, or Firm*—Pennie & Edmonds LLP

(57) ABSTRACT

A pipe coupling comprises a socket including a cylindrical main body having an axial bore for a fluid, an annular valve seat at the forward end, a ball type valve body rotatable relative to the valve seat and having a through hole and a casing fitted over the main body and rotatably retaining the ball valve in cooperation with the valve seat, and a plug inserted in the through hole. The casing has a long hole including a wider area and a narrower area. The ball valve communicates the through hole with the axial bore when the through hole is aligned with the narrower area and closes the axial bore when the trough hole is aligned with the wider area. The coupling comprises a guide for guiding the ball valve along the long hole from a position in which the through hole is aligned with the wider area.

9 Claims, 6 Drawing Sheets

PIPE COUPLING

CROSS-REFERENCE TO RELATED APPLICATIONS

This application is based upon and claims the benefit of priority from the prior Japanese Patent Application No. 2000-362535, filed Nov. 29, 2000, the entire contents of which are incorporated herein by reference.

BACKGROUND OF THE INVENTION

1. Field of the Invention

The present invention relates to a pipe coupling for connection to an associated pipe for feeding, in particular a fluid such as paint.

2. Description of the Related Art

Conventionally, this type of pipe coupling comprises a plug and a socket mutually connected to each other. The socket comprises a ball type valve body having a through hole formed to allow the plug to be inserted therein, a main cylindrical body having a fluid passage formed therein, an annular sealing member provided at a forward end portion in a concentrical relation to the fluid passage, and a valve body seating surface formed at the forward end of the sealing member with the valve body arranged thereon, and a casing fixed to the main cylindrical body to surround and support the valve body in a rotatable way. A long hole for allowing the plug to be inserted into the through hole of the valve body is formed in the casing such that it is opened from the side surface toward the top area of the casing and that a wider area is provided at the side surface opening portion of the long hole in the casing and a narrower area is provided at the top area opening portion. The plug has an anti-slippage bulged portion insertable into the long hole at the wider area and latchable to the side edge of the long hole at the narrower area. By inserting the plug into the through hole of the valve body at the wider area of the long hole and, from this state, rotating the plug to the narrower area at the top area of the long hole, the plug is connected to the socket. With the rotation of the plug, the valve body is also rotated and, when the plug is rotated to the narrower area at the top area of the long hole, the through hole of the valve body is aligned with the fluid passage of the main cylindrical body to make the fluid passage of the plug communicate with the fluid passage of the main cylindrical body.

According to the so-structured pipe coupling, the valve body surrounded with, and supported by, the casing is freely rotatable and no restriction is made to its rotation direction. In the case where, however, any shock is exerted on the valve body at a washing of the socket or due to some cause or other, the valve body is rotated, causing the through hole of the valve body to be displaced out of alignment with the long hole of the casing, that is, to be slipped out of the long hole. In this case, it becomes difficult to insert the plug from the long hole into the through hole of the valve body. Further, when the plug is set in the connected state, the plug is not withdrawn out of the socket, thus presenting a problem.

BRIEF SUMMARY OF THE INVENTION

An object of the present invention is to provide a pipe coupling for ensuring an easier connection and separation of the plug to and from the socket.

Another object of the present invention is to provide a pipe coupling which can lock a plug and socket in a mutually-connected state.

According to the present invention, there is provided a pipe coupling comprising a socket including a main cylindrical body having a forward end section and an axial bore for allowing a fluid to pass therethrough, an annular valve seat fitted into the forward end section of the main cylindrical body in a concentrical relation to the axial bore, a ball type valve body arranged to be rotatable relative to the valve seat and having a through hole, and a casing fitted over the main cylindrical body and rotatably retaining the valve body in cooperation with the valve seat. The casing has a cylindrical side surface, a top area and a long hole extending from the side surface toward the top area and having a wider area formed at the side surface and a narrower area situated at the top area, and the valve body allows the through hole to communicate with the axial bore of the main cylindrical body when the through hole is aligned with the narrower area of the long hole and to close the axial bore when the through hole is aligned with the wider area of the long hole. The pipe coupling further comprises a plug having an outer periphery and a bulged portion situated on the outer periphery and passable through the wider area of the long hole and not passable through the narrower area. The plug is inserted into the through hole of the valve body through the wider area of the long hole, and is connected to the socket in a mechanical and fluid-communication way when the plug is moved along the long hole to the narrower area together with the valve body. The pipe coupling further comprises a guide for guiding the valve body along the extending direction of the long hole from a position in which the through hole is aligned with the wider area.

According to this pipe coupling, the valve body is guided along the extending direction of the long hole and, even if a force is exerted on the valve body due to some reason or other, the through hole is located within the long hole. By doing so, it is possible to easily and positively confirm the position of the through hole of the valve body and hence to easily insert and withdraw the plug into and out of the socket.

Preferably, the guide has a slide section for guiding the valve body to allow the through hole to move along the extending direction of the long hole and a latching section for restricting the rotation of the valve body to allow the through hole to move between a position in which the through hole is aligned with the wider area of the long hole and a position in which the through hole is aligned with the narrower area of the long hole. Since the valve body has its rotation restricted by the latching section, it is possible to positively locate the valve body to a required position and easily and smoothly insert and withdraw the plug into and out of the socket.

It is useful to provide a lock at least on one of the plug and socket whereby it prevents the plug from being moved when the plug is set to the narrower area of the long hole. In this case, even if a force is exerted on the plug for some reason or other, the plug is not moved from the narrower area and it is possible to positively prevent an unauthorized withdrawal of the plug out of the socket.

Preferably, the slide section has a first planar surface formed on the inner surface of the casing in a manner substantially parallel to the extending direction of the long hole, and a second planar surface formed on the valve body to be set in contact with the first planar surface. Preferably, the latching section is formed on the inner surface of the casing and on the valve body and has first engaging portions mutually engaging in a position in which the through hole is aligned with the wider area of the long hole and second engaging portions mutually engaging in a position in which the through hole is aligned with the narrower area of the long hole.

In the case where the first and second engaging portions have planar surfaces respectively extending in a direction substantially orthogonal to the extending direction of the long hole, the valve body can be accurately and positively located relative to the casing.

Preferably, the lock as set out above has a sleeve fitted over the plug and movable along an axial direction and the casing has a sleeve-latchable projection on the peripheral portion of the narrower area. This sleeve may be urged by a spring toward the forward end of the plug or have an internally threaded section engageable with an externally threaded section on the outer peripheral surface of the plug.

DETAILED DESCRIPTION OF THE INVENTION

Figure 1:
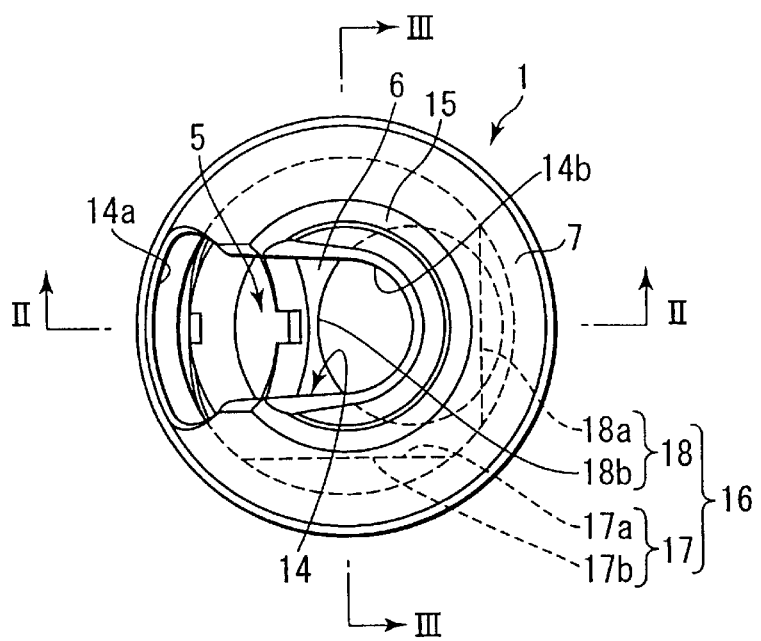
FIG. 1 is a plan view diagrammatically showing a socket of a pipe coupling according to a preferred embodiment of the present invention.
Figure 2:
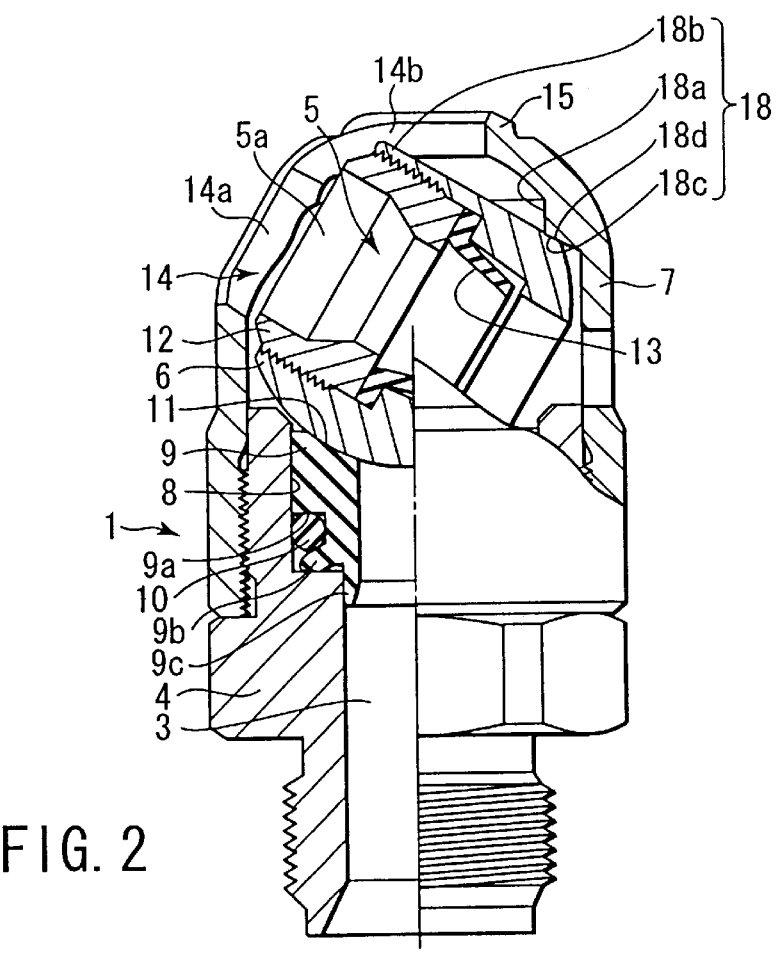
FIG. 2 is a side view showing a portion of a cross-section taken along line II—II in FIG. 1.
Figure 3:
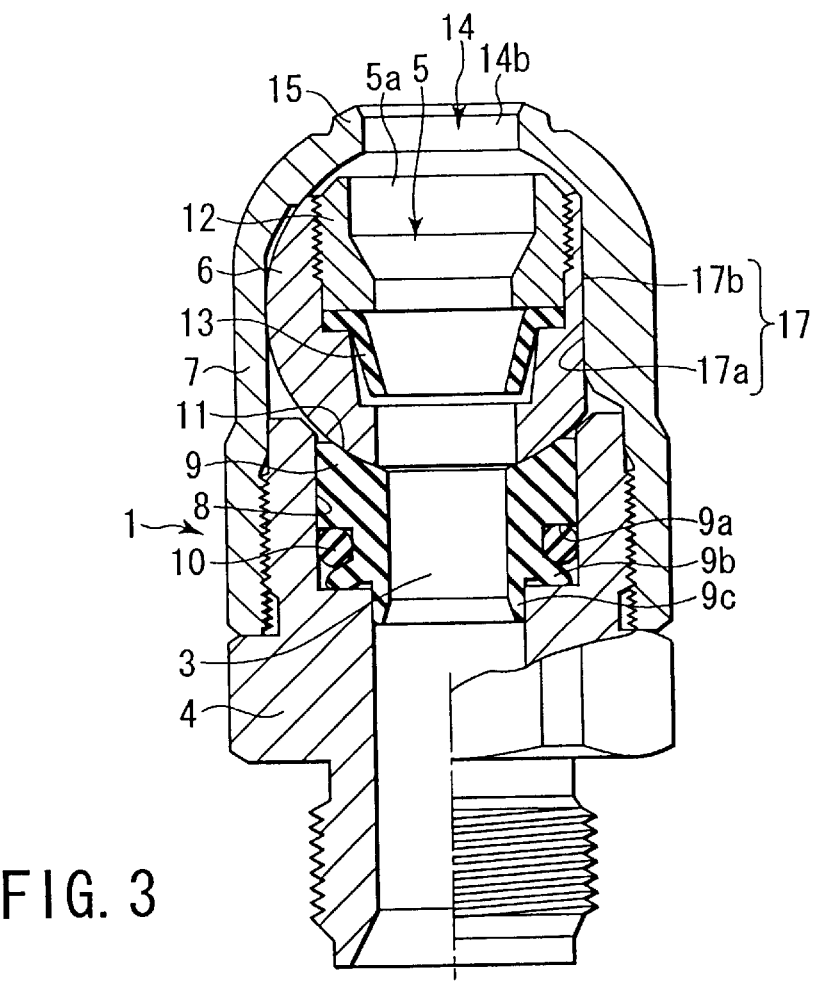
FIG. 3 is a partial cross-sectional view taken along line III—III in FIG. 1 which shows an aligned state between a through hole of a ball type valve body and a fluid passage.
Figure 4:
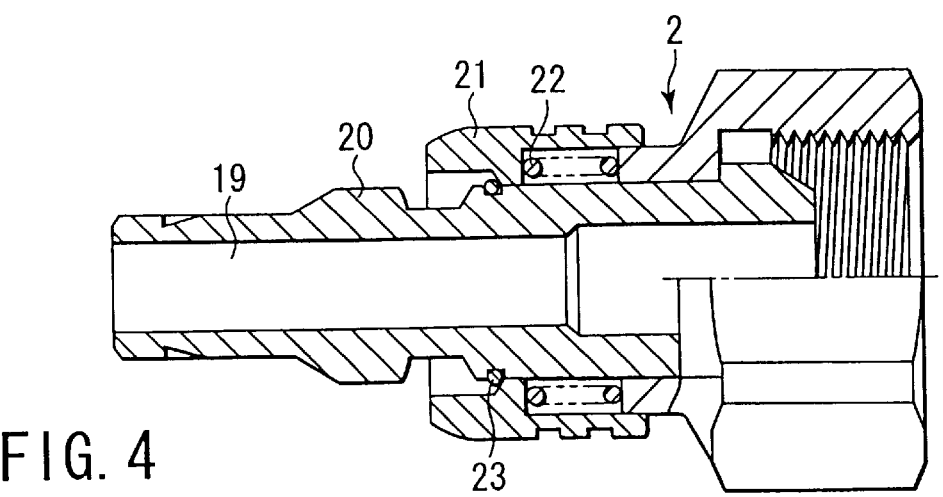
FIG. 4 is a partial cross-section view diagrammatically showing a plug of the pipe coupling according to the preferred embodiment of the present invention.
Figure 5:
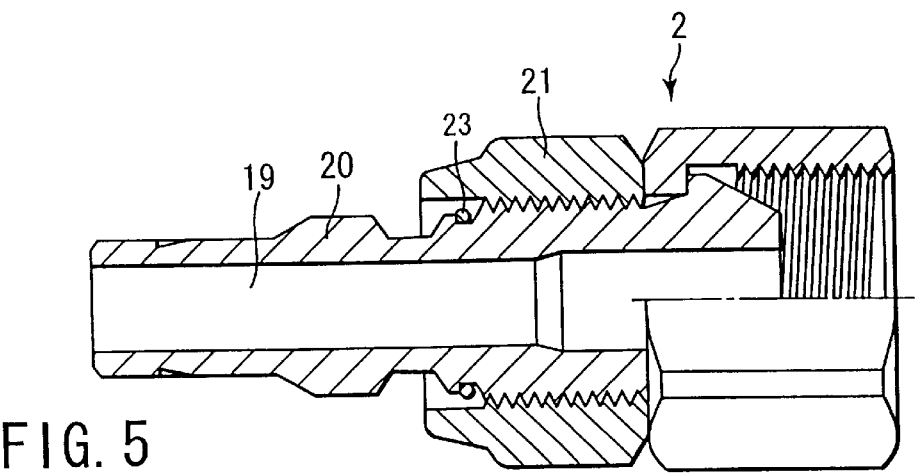
FIG. 5 is a partial cross-sectional view, similar to that of FIG. 4, showing a plug according to another practical form of the present invention.

A practical form of a pipe coupling according to an embodiment of the present invention will be explained in more detail below by referring to the accompanying drawings. FIGS. 1 to 3 show a practical form of a socket in the pipe coupling of the present invention. FIGS. 4 and 5 show a practical form of a plug in the pipe coupling of the present invention. In the drawing, reference numeral 1 represents the socket and 2 represents the plug connected to the socket. The socket 1 comprises a main cylindrical body 4 having a fluid passage therein, a ball type valve body 6 having a through hole 5 for allowing the plug 2 to be inserted therein and rotatably set within the main cylindrical body, and a casing 7 threaded over, and fixed to, the main cylindrical body 4. The casing 7 surrounds the valve body 6 and supports it in a rotatable way.

The fluid passage 3 of the main cylindrical body 4 has a large diameter section 8 on its forward end side and an annular sealing member 9 made of a resin and inserted into the large diameter section 8 in a concentric relation to the fluid passage 3. At the lower portion of the sealing member 9, an annular groove 9a, tapering annular projection 9b and a small diameter section 9c are sequentially provided. The small diameter section 9c is fitted on the fluid passage 3 of the main cylindrical body 4. An elastic ring 10 is fitted in the annular groove 9a and urges the sealing member 9 toward a valve body receiving surface side and annular projection 9b side as will be set out below. As the elastic ring 10 use may be made of an O ring or an annular coil spring. Reference numeral 11 shows a valve body receiving surface formed at the forward end of the sealing member 9 and providing a tapering surface or curved surface. The valve body 6 is set in rotatable contact with the valve body receiving surface 11. Thus, the sealing member 9 serves as a valve seat coacting with the valve body 6.

A carrier ring 12 is threaded into the through hole 5 of the valve body 6 to support the plug 2 at the plug 2 insertion side. Further, a sealing ring 13 is attached to a deep area side of the through hole 5 to effect a seal between the through hole 5 and the plug 2 inserted into the through hole 5.

A long hole 14 for allowing the insertion of the plug 2 into the through hole 5 of the valve body 6 is opened from the side surface toward the top area of the casing 7. The side surface opening portion of the casing 7 in the long hole 14 provides a wider area 14a for allowing the insertion of a later-described bulged portion formed on the outer periphery of the plug 2 while, on the other hand, the top area opening portion provides a narrower area 14b for allowing the bulged portion of the plug 2 to be latched to its side edge so that it is prevented from slipping out.

The relation between the long hole 14 of the casing 7 and the through hole 5 of the valve body 6 is set as follows. That is, when the plug insertion side opening portion 5a of the through hole 5 is set to an open position within the wider area 14a of the long hole 14, the valve body 6 blocks the fluid passage 3 of the socket 1, that is, the main cylindrical body 4 (FIG. 2). When, on the other hand, the opening portion 5a is set to an open position within the narrower area 14b of the long hole 14, a communication is established between the through hole 5 and the fluid passage 3 (FIG. 3).

Further, at the top area of the casing 7, a projection 15 is provided along a closed-end side peripheral edge of the narrower area 14b of the long hole 14 so as to be fitted over a latter-described lock provided on the plug 2.

A guide 16 is provided at the casing 7 to guide the valve body 6 so that the opening portion 5a of the through hole 5 moves from a position aligned with the side surface opening portion of the long hole 14 toward the extending direction of the long hole 14.

The guide 16 comprises a slide section 17 for guiding the valve body 6 to allow the through hole 5 to move along the long hole 14 and a latching section 18 for restricting the rotation of the valve body 6 in a moving range between the wider area 14a in which the through hole 5 allows the plug 2 to be inserted into the long hole 14 and the narrower area 14b corresponding to the connection position of the plug 2.

The slide section 17 comprises a planar surface 17a provided on the inner surface of the casing 7 in a direction parallel to the longitudinal direction of the long hole 14 and a planar surface 17b provided on the valve body 6 which is set in slidable contact with the planar surface 17a at all times.

The latching section 18 is formed on the inner surface of the casing 7 and on the valve body 6 in a direction orthogonal to the planar surfaces 17a and 17b and comprises engaging portions 18a, 18b mutually engageable when through hole 5 is located at the wider area 14a of the long hole 14 and engaging portions 18c and 18d mutually engageable when the through hole 5 is located at the narrower area 14b of the long hole 14.

The plug 2 has a fluid passage 19 therein and a bulged portion 20 on its outer periphery. The bulged portion 20 can be inserted into the casing from the wider area 14a of the long hole 14 of the casing 7. When, on the outer hand, the plug 2 is rotated to the narrower area 14b, the bulged portion 20 is latched to the inner surface of the side edge of the narrower area 14b and the plug 2 is prevented from slipping out of the through hole 5 of the valve body 6, so that the plug 2 is connected to the socket 1.

With the plug 2 located at the narrower are 14b of the long hole 14 and hence the fluid passage 19 of the plug 2 set in communication with the fluid passage 3 of the main cylindrical body 4, a cylindrical lock 21 is provided on the plug 2 such that it is fitted over the projection 15 provided on the periphery of the narrower area 14b.

The lock 21 has a cylindrical sleeve fitted over the outer periphery of the plug 2 and movable in its axial direction. The sleeve is moved forward to fit it over the projection 15 and backward to disengage it. In the plug 2 shown in FIG. 4, the cylindrical lock 21 is fitted over the outer periphery of the plug 2 and is movable in its axial direction. The lock 21 is urged by a spring 22 in a forward direction. Reference numeral 23 shows a stop ring for preventing the lock 21 form slipping out in the forward direction. In a plug 2 shown in FIG. 5, a cylindrical lock 21 is threadably fitted on the outer periphery of the plug 2 and, by turning the lock 21, the lock 21 is moved forward and backward.

Figure 6:
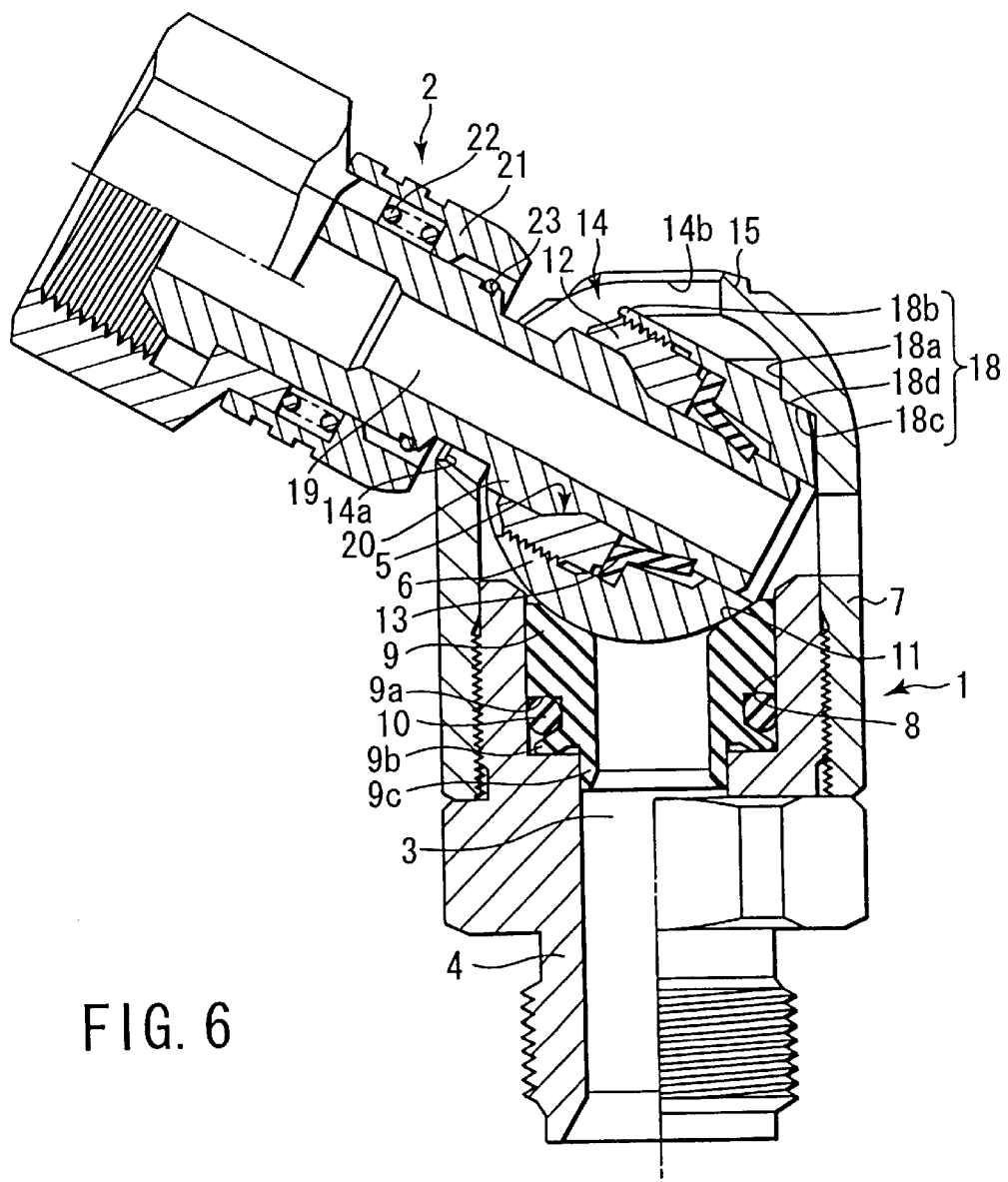
FIG. 6 is a cross-sectional view showing a state in which a plug shown in FIG. 4 is inserted into a valve body of a socket shown in FIG. 1.
Figure 7:
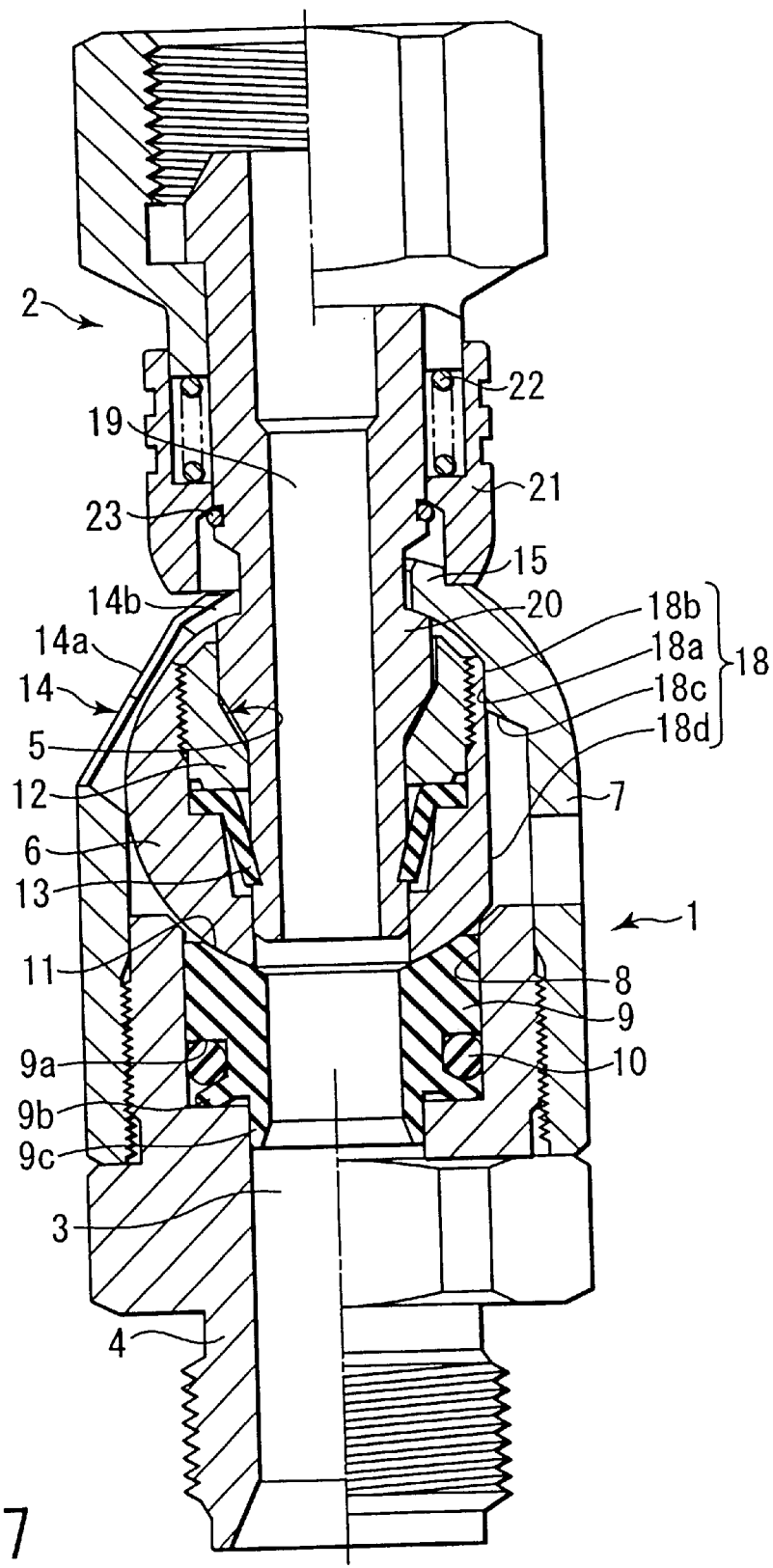
FIG. 7 is a partial cross-sectional view showing a state in which the plug is rotated from a state of FIG. 6 to a position in which the plug is not withdrawable out of the socket.

An explanation will be made below about how to connect the plug 2 to the socket 1. FIGS. 6 and 7 show the coupling of the plug 2 shown in FIG. 4 and the socket.

First, the through hole 5 of the valve body 6 in the socket 1 is set in such a state that it is opened to a position of the wider area 14a of the long hole 14 formed in the casing 7. In this state, the fluid passage 3 of the socket 1 is closed by the valve body 6.

Then, with the lock 21 of the plug 2 moved backward against an elastic force of the spring 22, the plug 2 is inserted from the wider area 14 of the long hole 14 into the through hole 5 of the valve body 6 and the bulged portion 20 formed on the outer periphery of the plug 2 is located within the casing 7. In this state, the through hole 5 of the valve body 6 and plug 2 are sealed by the sealing member 13 (FIG. 6).

After the insertion of the plug 2 into the through hole 5 of the valve body 6 is completed, the plug 2 is rotated toward the top area direction of the casing 7 along the long hole 14 formed in the casing 7 to set the plug to the narrower area 14b. In this state, the through hole 5 of the valve body 6 is set in communication with the fluid passage 3 of the main cylindrical body 4 and, by doing so, the fluid passage 3 of the main cylindrical body 4, that is, the socket 1, is set in communication with a fluid passage 19 of the plug 2. At the narrower area 14b of the top portion of the long hole 14, the bulged portion 20 of the plug 2 is latched to the inner side of the side edge of the long hole 14 to prevent the plug 2 from slipping out of the socket 1. By doing so, the plug 2 is connected to the socket 1.

When the plug is so connected to the socket 2, the lock 21 which is moved backward is released and, by doing so, the lock 21 is moved forward under the urging force of the spring 22 to fit over the projection 15 formed on the edge portion of the narrower area 14b of the long hole 14. As a result, the plug 2 is prevented from being rotated toward the direction of the wider area 14a of the long hole 14, so that the plug is locked to the socket 1 in a connected state (FIG. 7).

In the case where the plug is detached from the socket 2, the lock 21 is moved backward to disengage it from the projection 15. Then, the plug 2 is rotated to the wider area 14a of the long hole 14 (FIG. 6) and, from this position, the plug 2 is pulled backward and hence the plug is separated from the socket 1.

Since, at the coupling and separation of the plug 2 to and from the socket 1, the valve body guide 16 is so provided as to have the slide section 17 for restricting the rotation of the valve body 6 to allow the through hole 5 to move only along the long hole 14 and the latching section 18 for restricting the rotation of the valve body 6 to allow the through hole 5 to move in an angle range between a plug insertable position at the wider area 14a of the long hole 14 and a plug coupling position at the narrower area 14b of the long hole 14, it is possible to easily and positively connect and separate the plug 2 to and from the socket 1.

Further, even if any shock is exerted on the socket 1 due to some cause or other with the plug detached from the socket, the through hole 5 of the valve body is retained, by the valve body guide 16, in a state to correspond to the side opening portion of the long hole 14 at all times. Therefore, the plug 2 can be positively inserted into the through hole 5 of the valve body 6 and, since, upon the washing of the socket 1, the trough hole 5 is not displaced from the long hole 14, the washing operation of the socket 1 becomes easier.

Figure 8:
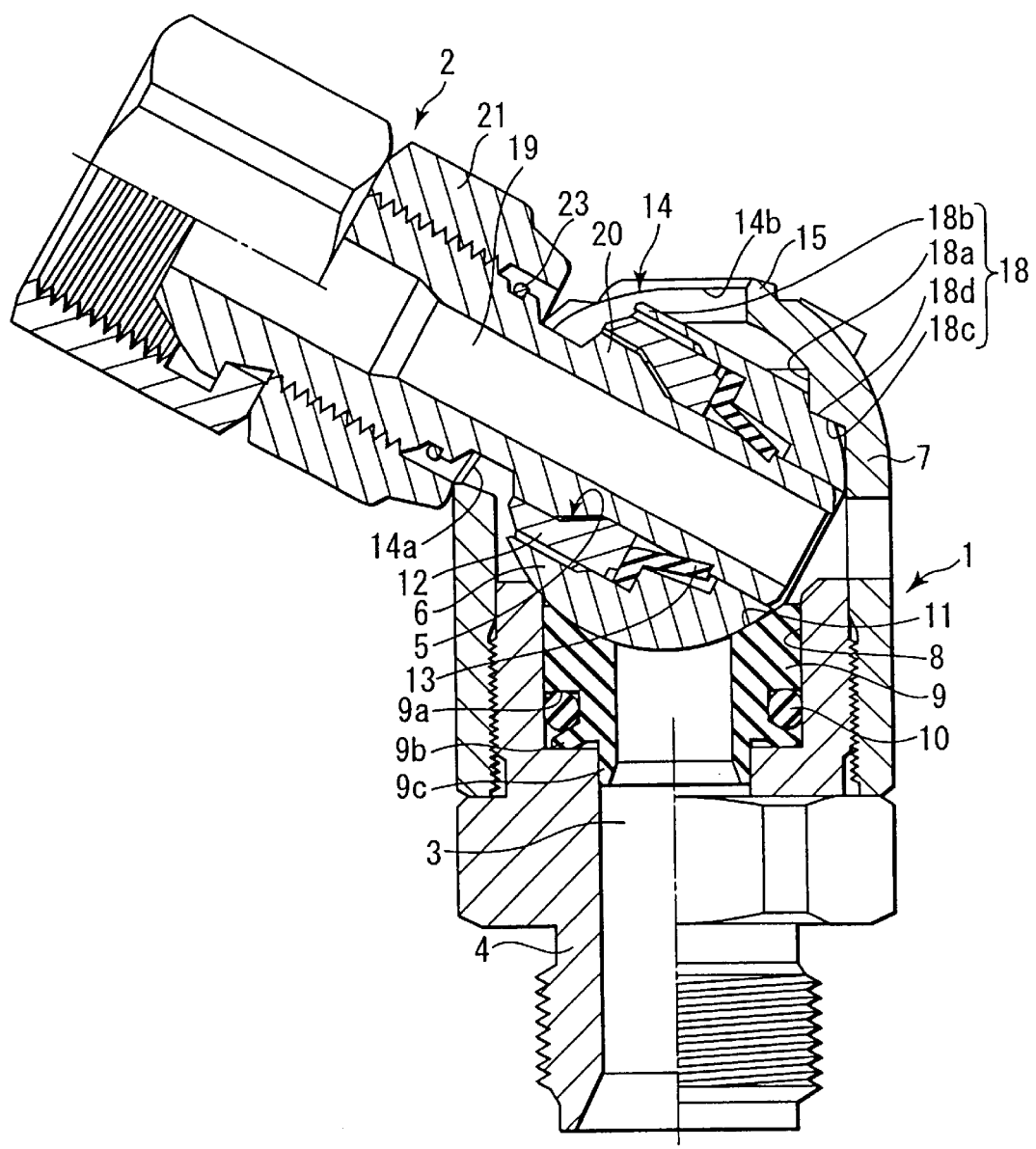
FIG. 8 is a cross-sectional view, similar to that of FIG. 6, showing a state in which the plug shown in FIG. 5 is inserted into the socket shown in FIG. 1.
Figure 9:
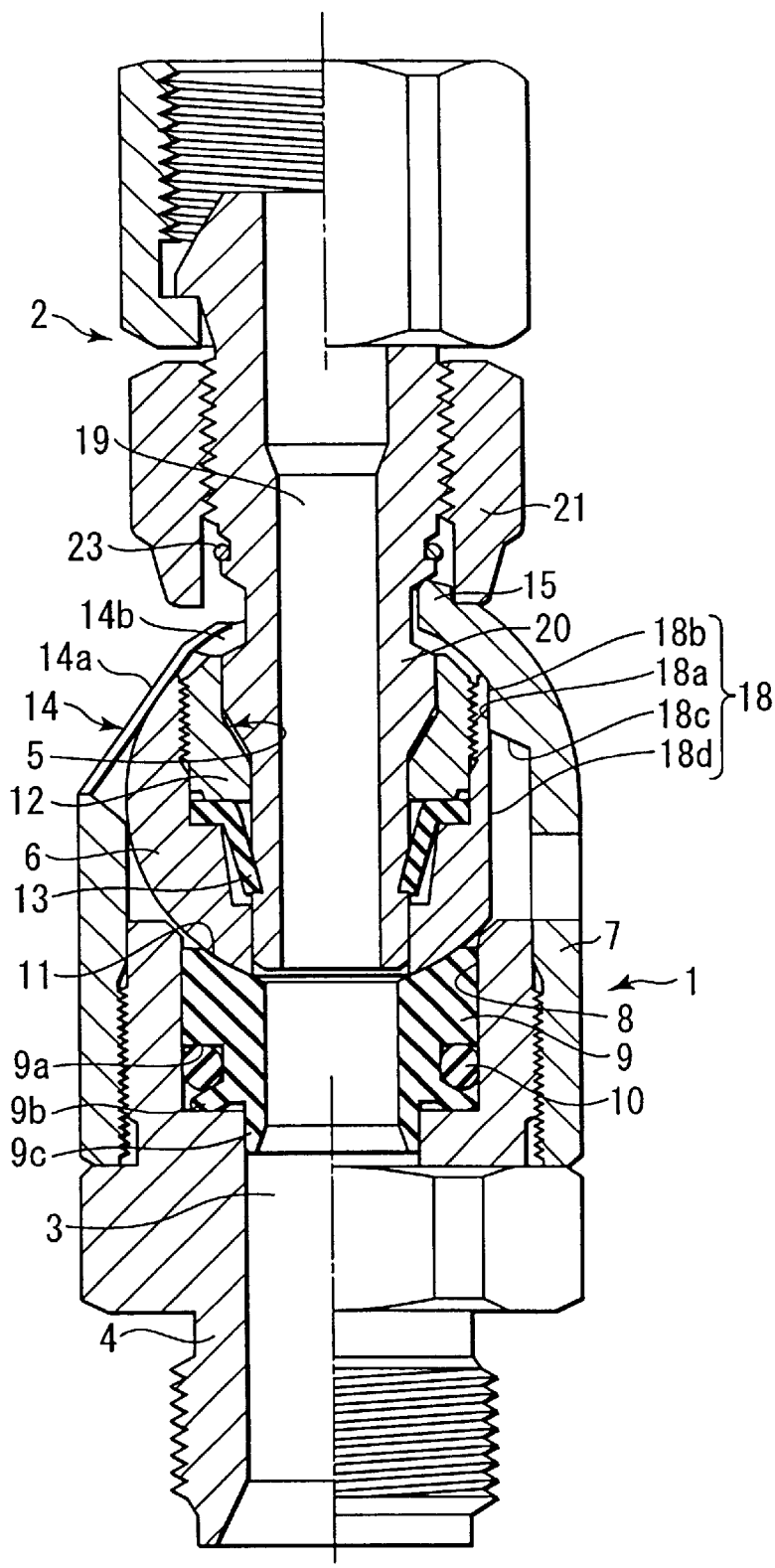
FIG. 9 is a cross-sectional view, similar to that of FIG. 7, showing a state in which the plug is not withdrawable out of the socket.

FIGS. 8 and 9 show the coupling of the plug 2 shown in FIG. 5 to the socket 1. In this embodiment, upon the coupling of the plug to the socket, the lock 21 of the plug is rotated backward and, in this state, the plug 2 is inserted from the wider area 14a of the long hole 14 into the through hole 5 of the valve body 6 (FIG. 8). After the coupling of the plug 2 to the socket 1, the lock 21 which has been moved backward is moved forward, by rotating it in a reverse direction, to fit the lock 21 over the projection 15 formed on the narrower area 14b of the long hole 14 (FIG. 9). Other functions and advantage are the same as those explained in connection with FIGS. 6 and 7.

What is claimed is:

1. A pipe coupling comprises:
    a socket having a main cylindrical body including a forward end section and an axial bore for flowing a fluid therethrough, an annular valve seat fitted into the forward end section of the main cylindrical body in a concentrical relation to the axial bore, a ball type valve body arranged to be rotatable relative to the valve seat and having a through hole, and a casing mounted over the main cylindrical body and rotatably retaining the valve body in cooperation with the valve seat;
    the casing having a cylindrical side surface, a top area and a long hole extending from the side surface toward the top area and including a wider area formed at the side surface and a narrower area situated at the top area;
    the valve body allowing the through hole to communicate with the axial bore of the main cylindrical body when the through hole is aligned with the narrower area of the long hole and to close the axial bore when the through hole is aligned with the wider area;
    a plug having an outer periphery and a bulged portion situated at the outer periphery and passable through the wider area of the long hole and not passable through the narrower area;
    the plug being inserted into the through hole of the valve body through the wider area of the long hole, and being connected to the socket in a mechanical and fluid-communication way when the plug is moved along the long hole to the narrower area together with the valve body; and a guide for guiding the valve body along the extending direction of the long hole from a position in which the through hole is aligned with the wider area.

2. A pipe coupling according to claim 1, wherein the guide has a slide section for guiding the valve body to allow the through hole to move along an extending direction of the through hole and a latching section for restricting the rotation of the valve body to allow the through hole to move between a position in which the through hole is aligned with the wider area of the long hole and a position in which the through hole is aligned with the narrower area.

3. A pipe coupling according to claim 2, wherein a lock is provided at least on one of the plug and the socket to prevent the plug from being moved when the plug is located at the narrower area of the long hole.

4. A pipe coupling according to claim 2, wherein the slide section has a first planar surface formed on an inner surface of the casing in a manner substantially parallel to the extending direction of the long hole and, a second planar surface formed on the valve body to be set in contact with said first planar surface at all times.

5. A pipe coupling according to claim 2, wherein the latching section is formed on the inner surface of the casing and on the valve body and has first engaging portions mutually engageable in a position in which the through hole is aligned with the wider area and second engaging portions mutually engageable in a position in which the through hole is aligned with the narrower area.

6. A pipe coupling according to claim 5, wherein the first and second engaging portions have planar surfaces respectively extending in a direction substantially orthogonal with the extending direction of the long hole.

7. A pipe coupling according to claim 3, in which a lock has a sleeve on the plug and is movable along an axial direction thereof and the casing has a sleeve-latchable projection on a peripheral portion of the narrower area.

8. A pipe coupling according to claim 7, wherein the lock has a spring for urging the sleeve toward the forward end of the plug.

9. A pipe according to claim 7, wherein the plug has an externally threaded section formed on an outer periphery thereof and the sleeve has an internally threaded section engageable with the externally threaded section.

* * * * *